Figure 1:
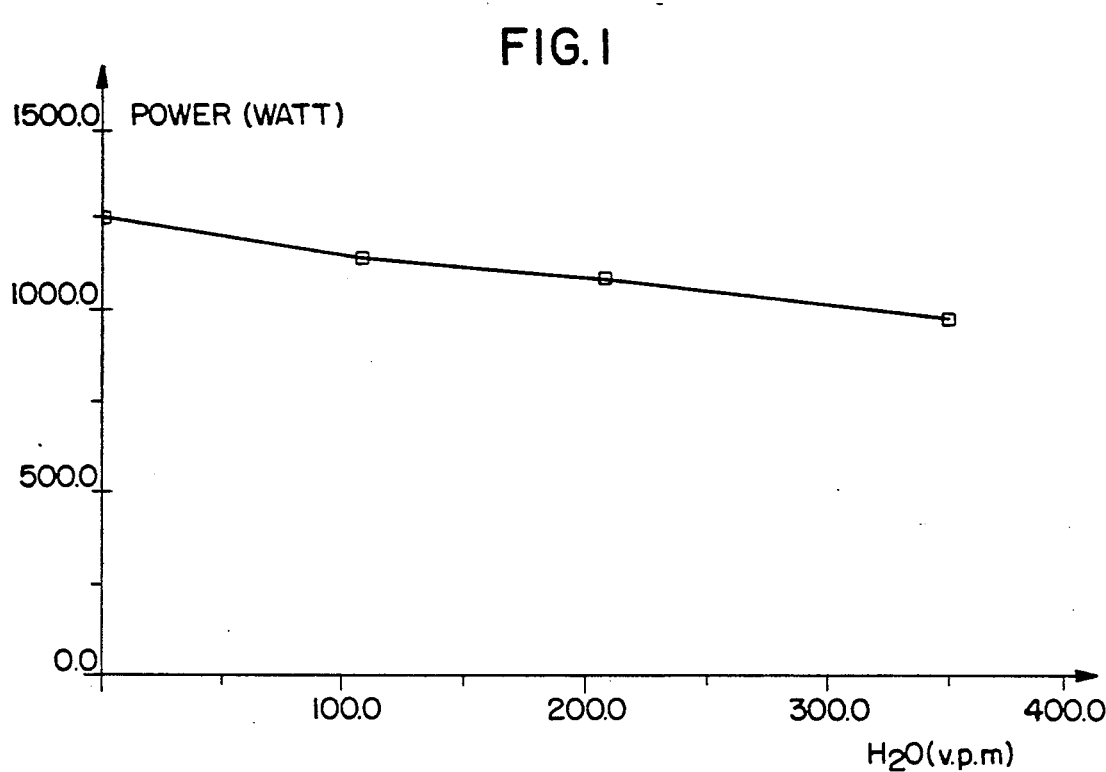

United States Patent [19]

Larue et al.

[11] Patent Number: 5,073,897

[45] Date of Patent: Dec. 17, 1991

[54] GASES TO BE USED FOR $CO_2$ LASER OPERATION AND PROCESS OF OPERATING WITH $CO_2$ LASER

[75] Inventors: Jean-Pierre Larue, Montreal, Canada; Bruno Marié, Le Mesnil St Denis, France; Christine Marot, Versailles, France; Lahcen Ougarane, Montigny le Bretonneux, France; Philippe Van der Have, Johannesburg, South Africa

[73] Assignee: L'Air Liquide, Societe Anonyme Pour L'Etude Et L'Exploitation Des Procedes Georges Claude, Paris, France

[21] Appl. No.: 477,836

[22] PCT Filed: Sep. 25, 1989

[86] PCT No.: PCT/FR89/00486

§ 371 Date: Apr. 13, 1990

§ 102(e) Date: Apr. 13, 1990

[87] PCT Pub. No.: WO90/03676

PCT Pub. Date: Apr. 5, 1990

[30] Foreign Application Priority Data

Sep. 26, 1988 [FR] France .................. 88 12527

[51] Int. Cl.⁵ ............................................... H01S 3/22
[52] U.S. Cl. ................................................ 372/59
[58] Field of Search ........................ 372/33, 59, 55, 39

[56] References Cited

U.S. PATENT DOCUMENTS 3,813,612  5/1974  Schriever et al. .................. 372/33

OTHER PUBLICATIONS

Applied Physics Letters, vol. 7, No. 1 of Jul. 1, 1965, J. A. Howe: "Effect of Foreign Gases on the $CO_2$ Laser: R-branch Transitions", pp. 21, 22.

Journal of Applied Physics, vol. 56, No. 9 of Nov. 1, 1984, American Institute of Physics (N.Y.), K. Midorikawa et al., "Comprehensive Study of a $CO_2$ Laser Using Electrochemical Transformation of Organic Compounds", pp. 2487-2490, voir p. 2487.

*Primary Examiner*—Léon Scott, Jr.
*Attorney, Agent, or Firm*—Young & Thompson

[57] ABSTRACT

These gases, specially adapted to the need of $CO_2$ lasers, have a total purity less than 99.995%, a water content lower than 5 vpm and a total hydrocarbon content lower than 5 vpm.

8 Claims, 1 Drawing Sheet

GASES TO BE USED FOR CO₂ LASER OPERATION AND PROCESS OF OPERATING WITH CO₂ LASER

DESCRIPTION

The present invention relates to gases to be used for $CO_2$ laser operations, i.e. gases comprising as components, at least helium, nitrogen and carbon dioxide ($CO_2$) and intended to be introduced as active medium into the cavity of so-called "$CO_2$ lasers".

There is presently on the market gases of two types of purity: gases of so-called "industrial purity", whose guaranteed purity is generally in the vicinity of 99.5%, and gases of so-called "scientific purity", whose guaranteed purity is generally 99.995% or more.

Since the gases of industrial purity are not sufficiently purified for the requirements of lasers, the gases used for laser operations are of scientific purity, and have the disadvantage of being very costly.

The invention intends to provide more economical gases, which are particularly adapted to $CO_2$ lasers.

For this purpose, it is an object of the present invention, according to a first aspect thereof, to provide a premixed gas for use in laser operation, containing at least helium, nitrogen and $CO_2$, characterized in that it has a total purity less than 99.995%, a water content lower than 5 vpm and a total hydrocarbon content lower than 5 vpm (vpm = volume parts per million).

According to a second aspect, it is an object of the invention to provide a gas than can be used for laser production containing at least helium, nitrogen and $CO_2$ and obtained by mixing at least two gases in situ, characterized in that (a) each of said gases has a total purity less than 99.995% and has a water content lower than 5 vpm and a total hydrocarbon content less than 5 vpm, with the possible exception of $CO_2$ when the latter constitute one of said gases, wherein said $CO_2$ may have a water content less than 20 vpm, and (b) the mixture has a water content lower than 5 vpm and a total hydrocarbon content lower than 5 vpm.

It is also an object of the present invention to provide a process for operating with $CO_2$ laser in which a gas for $CO_2$ laser operation defined above is introduced into the cavity of the laser.

As it will easily be understood, in the composition of a gas, a distinction has to be made between the components on the one hand, which are intentionally introduced therein, sometimes even at very low concentrations, and the impurities, which are normally present in the gas, sometimes in non negligible quantities if the gas, or its components before mixing, are not highly purified. Thus, the same substance may constitute a component for a gas and an impurity for another, as it will be seen later with respect for example of oxygen, carbon monoxide, $CO_2$ and nitrogen.

On the other hand, we are only concerned herein with the impurities which are normally found in the industrial production of the components of gases used for $CO_2$ laser operations, such as: water, oxygen, carbon monoxide, $CO_2$, $C_nH_m$ hydrocarbons, hydrogen, nitrogen, argon, neon, COS and $SO_2$.

Figure 2:
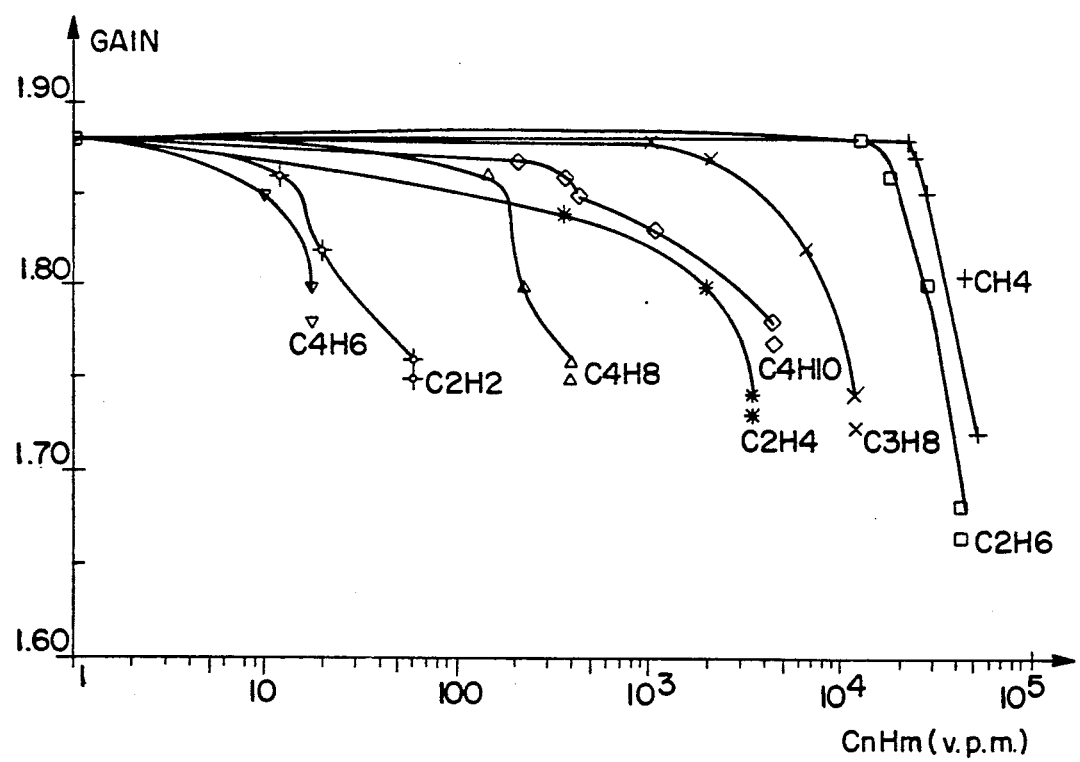

Examples of gases used for laser operations according to the invention will now be described with reference to the annexed drawings, in which:

FIG. 1 is a diagram illustrating the variation of the power, measured on an industrial $CO_2$ laser of the rapid axial flux type, under a pressure of 80 mb and a current of 510 mA, as a function of the water content of the gas used for laser operation which is introduced into the cavity of the laser; and FIG. 2 is a diagram illustrating the variation of the gain measured on an experimental $CO_2$ laser, as a function of the hydrocarbon content of the gas used for laser operation which is introduced into the cavity of the laser.

The Applicant has carried out extensive research on the influence on the operation of $CO_2$ lasers, of the presence of various impurities normally found in the industrial production of gases which enter into the composition of gases used for laser operation intended for these lasers. This research was essentially concerned with the gain obtained by lasers, at which value the power of the laser is proportional in first approximation.

The results have surprisingly shown that it was only necessary to garantee a high purity with respect to the humidity and hydrocarbons, while with respect to the other impurities, relatively high contents, which are completely compatible with those that can be found in the so-called gas of industrial purity, do not prevent the operation of the laser.

FIG. 1 shows that the power of the laser decreases linearly when the water content increases. However, water is undesirable, even at lower contents, because it destroys the stability of the discharge. Consequently, the gases used for laser operation should undergo a drying treatment, which brings back the water content to a value lower than 5 vpm.

FIG. 2 reproduces the results of tests carried out in the laboratory on an experimental laser.

An analysis of the results has led to the conclusion that in order not to substantially decrease the gain, i.e. of the order of 1 %, the total hydrocarbon content should be lower than 5 vpm. This takes into account the fact that some hydrocarbons can be destroyed by the discharge in the cavity of the laser and form other substances, in particular other hydrocarbons.

With respect to the other impurities which are present in the industrially produced gases:

argon, neon: no intrinsic effect on the gain has been observed for quantities up to 1 %.

hydrogen: no decrease of the gain has been observed with quantities up to 1,000 vpm.

COS, $SO_2$ no decrease of the gain has been observed with quantities up to 100 vpm, which is a value much higher than those observed in gases of industrial purity.

Other substances constitute impurities if they are not components of the gas used for laser production, namely CO and oxygen. Tests have shown that they do not give measurable decrease of the gain for contents up to 1,000 vpm.

In practice, the gases used for laser operation can be obtained in two forms:

(1) as a premixture: in this case, the only impurities to be considered are those which have been mentioned above. The operation of the laser is satisfactory with a total purity lower than that corresponding to scientific purity (99,995 %), as long as the water content and the total hydrocarbon content are both lower than 5 vpm.

(2) by mixing two or more gases in situ, i.e. just before introducing the mixture into the cavity of the laser, these gases could be the individual components of the gas used for laser operation or partial premixtures of these components.

In this case, impurities pertaining to each gas are considered as such, even though they are components of the final gas used for laser operation. For example, if there is produced a ternary gas for laser operation helium - nitrogen - $CO_2$ from three bottles respectively containing helium, nitrogen and $CO_2$, nitrogen and $CO_2$ will be considered as impurities towards helium, etc...

The conditions to fulfill in order to produce a gas for laser operation according to the invention are therefore that on the one hand each gas has a total purity less than 99.995%, and on the other hand, the final mixture has a water content lower than 5 vpm and a hydrocarbon total content lower than 5 vpm.

However, when $CO_2$ constitutes one of the gases to be mixed, its water content can reach 20 vpm, as long as that of the mixture remains lower than 5 vpm. This is possible since $CO_2$ is generally present in gases for laser operation in moderate quantities lower than 10 %.

By way of example, a gas for laser operation according to the invention having a composition 74 % helium, 20 % nitrogen and 6% $CO_2$ was obtained in two different ways:

(1) in premixed form, with the following impurity contents:

| | |
|---|---|
| $H_2O$ | 4 vpm |
| $O_2$ | 42 vpm |
| CO | 0,5 vpm |
| $C_nH_m$ | 1 vpm |
| $H_2$ | 0,5 vpm |
| Ne + Ar | 14.5 vpm |
| TOTAL | 62.5 vpm | the total purity of this gas for laser operation is consequently 99.99375%.

(2) from the three components separately supplied, with impurity contents indicated in the following table:

| impurities (vpm) | gas | | |
|---|---|---|---|
| | $N_2$ | $CO_2$ | He |
| $H_2O$ | 4 | 15 | 2 |
| $O_2$ | 3 | 10 | 5 |
| CO | 1 | 2 | 0,2 |
| $CO_2$ | 1 | — | 0,2 |
| $C_nH_m$ | 0,5 | 4 | <0,1 |
| $H_2$ | <0,1 | 1 | <0,1 |
| $N_2$ | — | 45 | 60 |
| Ar + Ne | 65 | — | 14 |
| TOTAL | 74 | 77 | 81 |
| Total Purity (%) | 99,9926 | 99,9923 | 99,9919 |

Thus, the mixture has a water content of 3.2 vpm and a total hydrocarbon content of 0.44 vpm.

The two gases for laser operation thus obtained gave satisfactory results.

The gases for laser operation according to the invention may contain, in addition to helium, nitrogen and $CO_2$, carbon monoxide and/or oxygen as components thereof.

We claim:

1. Premixed gas for laser operation, of the type containing at least helium, nitrogen and carbon dioxide ($CO_2$) said premixed gas having a purity less than 99.995%, a water content less than 5 parts per million by volume and a total hydrocarbon content less than b 5 parts per million by volume.

2. Gas for laser operation according to claim 1, wherein said purity is between 99.5% and 99.995%.

3. A gas for laser operation containing at least helium, nitrogen and carbon dioxide ($CO_2$) and obtained by in situ mixture of at least two gases, (a) each of said helium and nitrogen having a total purity less than 99.995%, a water content less than 5 parts per million by volume and a total hydrocarbon content less than 5 parts per million by volume, said $CO_2$ having a water content less than 20 parts per million by volume, and (b) the mixture has a water content less than 5 parts per million by volume and a total hydrocarbon content less than 5 parts per million by volume.

4. Gas for laser operation according to claim 3, wherein each of said gases has a purity between 99.5% and 99.995%.

5. A gas for laser operation according to claim 4, wherein the components of the gas comprise, in addition to helium, nitrogen and $CO_2$, at least one of carbon monoxide (CO) and oxygen.

6. A gas for laser operation according to claim 3, wherein the components of the gas comprise, in addition to helium, nitrogen and $CO_2$, at least one of carbon monoxide (CO) and oxygen.

7. A process of operating a $CO_2$ laser, comprising introducing into a cavity of the laser a gas for laser operation which is a premixed gas containing at least helium, nitrogen and carbon dioxide, said premixed gas having a purity less than 99.995%, a water content less than 5 parts per million by volume and a total hydrocarbon content less than 5 parts per million by volume, and stimulating said gas to emit coherent radiation.

8. A process of operating a $CO_2$ laser, comprising introducing into a cavity of the laser a gas for laser operation which is a gas containing at least helium, nitrogen and carbon dioxide and obtained by in situ mixture of at least two gases, (a) each of said helium and nitrogen having a total purity less than 99.995%, a water content less than 5 parts per million by volume and a total hydrocarbon content less than 5 parts per million by volume, said $CO_2$ having a water content less than 20 parts per million by volume and (b) the mixture has a water content less than 5 parts per million by volume and a total hydrocarbon content less than 5 parts per million by volume, and stimulating said gas to emit coherent radiation.

* * * * *